United States Patent [19]

Gutgsell

[11] 4,335,916
[45] Jun. 22, 1982

[54] TRUCK BED CAP STRUCTURE

[76] Inventor: David R. Gutgsell, 450B Herbig La., Jasper, Ind. 47546

[21] Appl. No.: 158,736

[22] Filed: Jun. 12, 1980

[51] Int. Cl.³ ............................................. B60P 7/02
[52] U.S. Cl. .................................. 296/100; 296/156; 296/216
[58] Field of Search ............... 296/100, 156, 216, 224

[56] References Cited

U.S. PATENT DOCUMENTS

| 2,596,903 | 5/1952 | Kropp | 296/224 |
| 3,489,456 | 1/1970 | Klanke | 296/100 |
| 4,221,423 | 9/1980 | Stone | 296/100 |

*Primary Examiner*—Robert R. Song
*Attorney, Agent, or Firm*—Warren D. Flackbert

[57] ABSTRACT

A cap or topper structure for the bed of a truck characterized by a base or main section and a rear section hingedly connected together at a pivot axis disposed along the upper horizontal surface of the cap or topper. The preceding arrangement serves, when in an operative position, i.e. when the rear section is moved upwardly or angled with respect to the truck bed, to provide ready access to the space on the truck bed covered by the cap or topper.

In one invention embodiment, the movable rear section of the cap or topper is hinged closer to the truck cab than in another invention embodiment, the former affording more access to the enclosed space, as by standing on the truck bed, while the latter permits easy access by a user standing on the ground adjacent the truck bed. In either instance, conventional components are employed for elevating and maintaining the movable rear section of the cap or topper at the aforesaid operative position for access purposes.

3 Claims, 7 Drawing Figures

TRUCK BED CAP STRUCTURE

As is known, the use of a cap or cover, also referred to herein as a topper, on a truck bed, such as found on a conventional pickup truck, is increasingly popular. In this connection, the caps or toppers, typically formed from a molded plastic resin, assume various configurations depending upon end usage requirements of the purchaser and, of course, upon the particular truck bed on which the cap or topper is to be placed.

Broadly, a unit of this type serves various functions, i.e., for example, the ready conversion of an open truck bed to an enclosed space; the usage of such enclosed space for protective hauling purposes; the adaptation of the enclosed space for shelter and/or storage in camping or similar outing/recreational purposes; and, the like. In other words, the versatility of a conventional pickup truck is usually increased manyfold through the employment of a cap or topper.

A principal drawback of the structures now available is in ready access to the covered space, where, typically, in this connection, the user gains entry through a door disposed on the upstanding rear surface of the installed unit. Such an arrangement proves troublesome in the instance where it is necessary, or at least desired, to retrieve or position an article from or at the portion of the cap or topper closest to the truck cab. Usually awkward bending and/or crawling becomes the end solution and, obviously, presents an undesirable feature of available design arrangements.

The invention overcomes the preceding difficulty by presenting a two-part cap or topper structure, i.e. a base or main section, mounted, as by bolting or clamping, onto the sides of the truck bed, and a pivotal or movable secondary or rear section. The pivot axis of the secondary section is along the top upper surface of the cap or topper, where, as will become evident, as such is disposed closer to the truck cab, more access space (or freedom for access) is provided for the user, and conversely.

In other words, the invention plays importance in affording ready access to a cap or topper covered truck bed, where, in one instance, the user can actually stand on the truck bed to reach desired far corners or areas of the covered bed, and, in another instance, stand adjacent to the truck bed, i.e. on the ground or other supporting surface, to readily reach into the covered space. Thus, it should be evident that the invention affords primary access purposes, in contrast to the limited or at least unhandy entry inherent with structures in use heretofore.

The invention is readily achieved, where the operative components necessary for mechanically elevating the rear section (either by hand or by other power means) of the cap or topper structure are conventional in form, as is the type of pivot axis or hinge employed and the particular sealing arrangement involved. With ready manufacturing capabilities, the invention importantly permits easy access to space covered by cap or topper structures without the necessity of undue bending, crawling or the like.

In any event, a better understanding of the present invention will become more apparent from the following description, taken in conjunction with the accompanying drawing, wherein FIG. 1 is a top plan view of a truck bed cap structure in accordance with the teachings of the present invention;

FIG. 4 is a view in vertical section showing other details of the truck bed cap structure, taken at line 4—4 on FIG. 3 and looking in the direction of the arrows;

Figure 1:
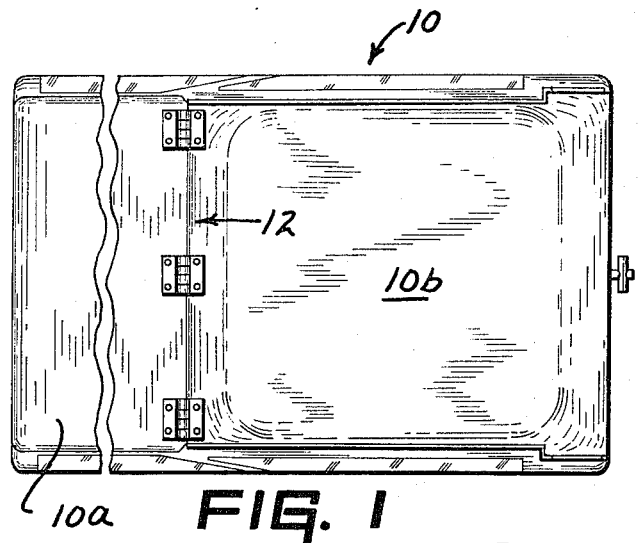
Figure 2:
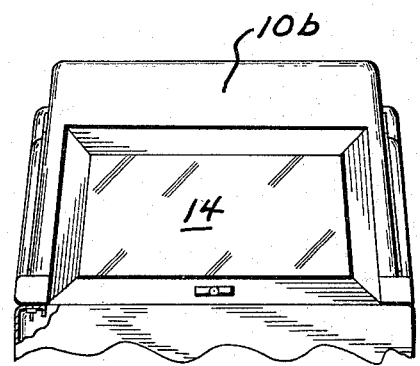
FIG. 2 is a view in end elevation of the truck bed cap structure of FIG. 1, looking from right to left in such figure.

For the purposes of promoting an understanding of the principles of the invention, reference will now be made to the embodiments illustrated in the drawing and specific language will be used to describe the same. It will nevertheless be understood that no limitation of the scope of the invention is thereby intended, such alterations and further modifications of the illustrated devices and such further applications of the principles of the invention as illustrated therein being contemplated as would normally occur to one skilled in the art to which the invention relates.

Figure 3:
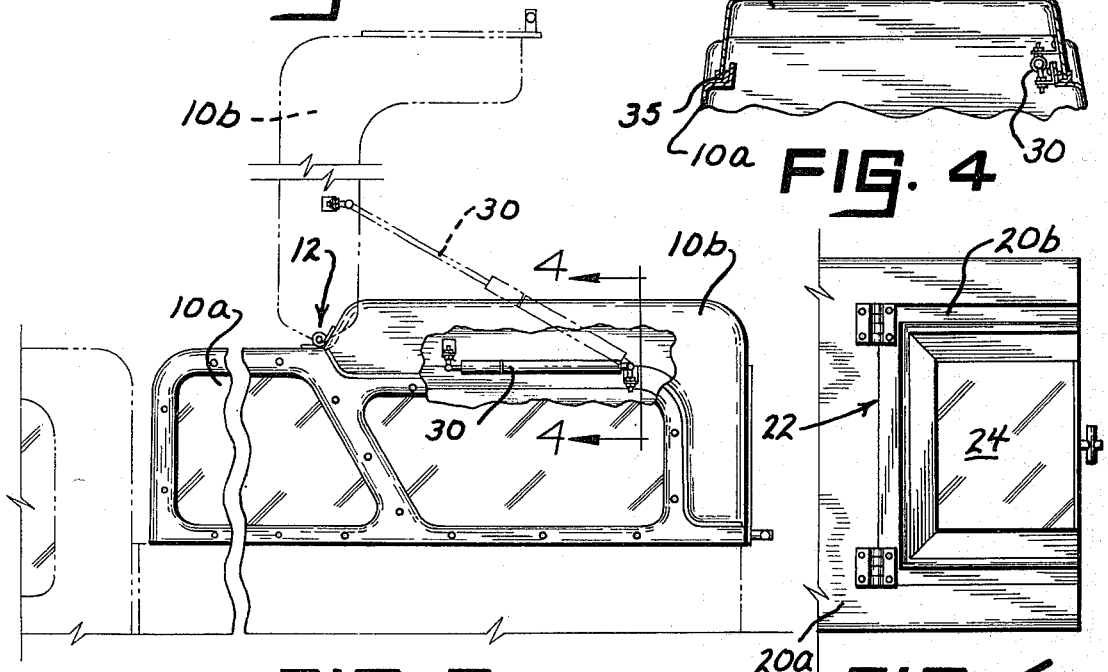
FIG. 3 is a view in side elevation, partly opened, generally comparing to that of FIG. 1 but looking from top to bottom in such figure, showing details of the truck bed cap structure, where the phantom lines represent the rear or movable section thereof at an elevated entry position.

Referring now to the figures, and particularly to FIGS. 1, 2, 3 and 4, a typical cap or topper arrangement presented by the invention is shown in combination with the bed of a pickup truck, including a cab portion (both of the latter being shown in phantom in FIG. 3). The cap or topper 10 is in two parts, i.e. a main or base section 10a, secured, by way of example, as by bolting (see FIG. 2), to the sides of the truck bed, and a secondary pivotal or movable rear section 10b, i.e. with respect to the truck bed, hingedly secured thereto.

Importantly, the pivot axis, or line of hinges in the illustration, identified by reference numeral 12, is disposed along the top or upper surface of the cap or topper 10, i.e. unlike present arrangements wherein access to the covered space is through a door or like opening in the rear vertical wall of the unit. In any event, inside or internal hinge clamps (not shown) are provided to maintain the sections 10a and 10b in a normally closed position.

In the invention form of the aforesaid figures, the pivot axis 12 is disposed in a region closer to the truck cab than to the back of the topper or cap 10, meaning that when the rear section 10b is elevated to the phantom line position of FIG. 3, the user can stand on the truck bed and have ready and immediate access to all areas in the covered space at the front of the topper, i.e. towards the truck cab.

In this connection, and in use, the user opens a window 14, typically located on the back wall of the rear section 10b, drops the truck tailgate (not shown) to a horizontal position and, thereafter, raises the rear section 10b of the cover or cap 10, usually while standing on the tailgate. The preceding is accomplished after the aforesaid internal hinge clamps are released. After raising, the rear section 10b is caused to remain at a resting position. Thus, at this time, ample floor area is available for user movement to various areas on the truck bed.

Figure 6:
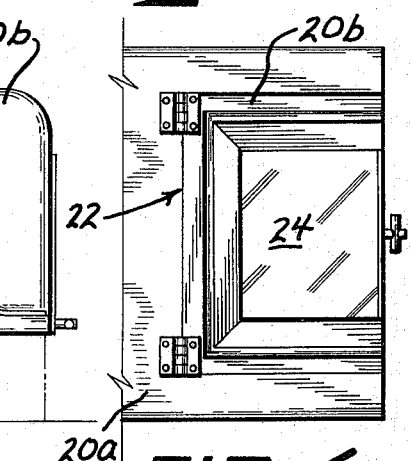
FIG. 6 is a top plan view, partly fragmentary, showing details of the alternative invention modification on FIG. 5; and, FIG. 7 is a view in rear elevation, partly opened, showing still further details of the alternative invention modification of FIGS. 5 and 6.
Figure 5:
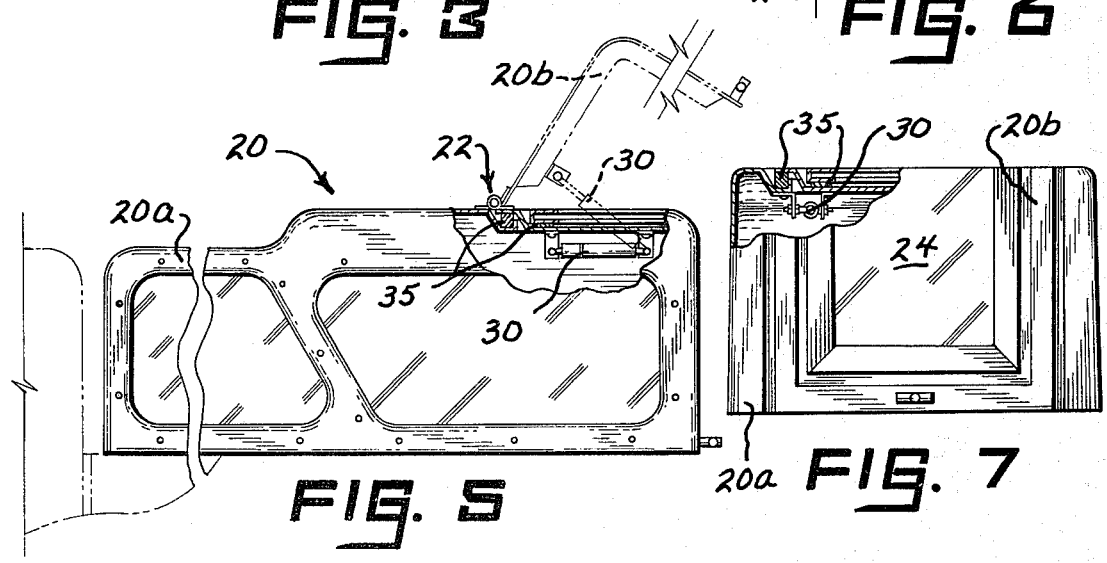
FIG. 5 is a view in side elevation of an alternative embodiment of the invention, also partly opened, i.e. a truck bed cap structure modified as to the location of the pivot axis, with the phantom lines also representing the elevated access or entry position of the rear movable section.
Figure 7:
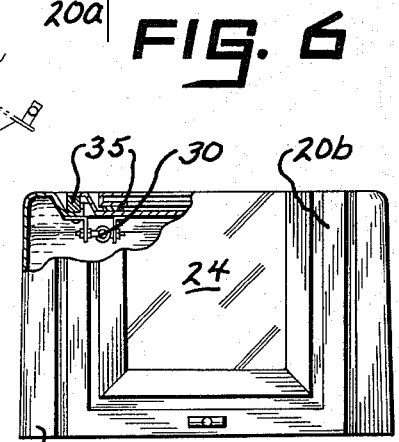

In the invention embodiment of FIGS. 5, 6 and 7, an arrangement is disclosed wherein, for example, a curved rear window 24 defines the movable or pivotal rear section 20b of cap or topper 20. In this instance, the pivot axis, identified by reference numeral 22, while still disposed along the top or upper surface of the cap or topper 20, is closer to the back end of the unit. In any event, when such rear section 20b is at an elevated or access position (shown in phantom in FIG. 5), the user also has ready access to the exposed space within the cap or topper 20. In this instance, however, the user is generally standing on the ground or other supporting surface adjacent the end of the topper unit, i.e. in contrast to standing on the truck bed as in the earlier discussed embodiment.

Various mechanisms or approaches are available for assisting in the raising or lowering of the pivotal or movable rear section 10b–20b of the topper 10–20, being representatively identified by reference numeral 30 on the drawing. Typically, the lifting mechanisms are disposed within the unit and are movable from a non-extended (shown in solid lines) position to an extended (shown in broken lines) position, and conversely.

While not necessarily needed to be particularized herein, various mechanically assisted lift arrangements might include, by way of example, a spring-loaded telescoping cylinder; an air/gas or hydraulically operated cylinder; an electric motor-gear arrangement; an electric winch; mechanisms employing a coil, leaf, or torsion spring; a hand crank; and, finally, but not to be overlooked, manual lifting, with, perhaps, pin locking provisions.

In a typically manufactured version, the cover or topper 10–20 is formed from a plastic resin or presented in fiberglass, aluminum or steel material, where various types of hinges serve the pivot axis 12–22 purposes. Again, and while not necessary to be detailed herein, in order to accomplish a watertight finished unit, various seal/gasket 35 arrangements might be employed, such as, for example, that shown in FIG. 4, including those types classified as rubber extrusion; two-piece magnetic rubber extrusion; vinyl extrusion; urethane foam; and, the like. The preceding may be similar to those in use in present automotive trunk lid and refrigerator door adaptations.

In the manner of usage, the arrangement can also be such that the raising of the movable or pivotal rear section 10b–20b of the cap or topper 10–20 may be accomplished only when mechanism for locking the rear window 14–24 is in an unlocked condition. Thus, the preceding prevents any unwanted movement of the rear section 10b–20b when the lock for the rear window 14–24 is in a locked condition.

From the preceding, it should be evident that the invention presents a two-part cap or topper structure for a truck bed which affords total loading and unloading without disturbing the physical relationship with the truck bed, including the commonly used (but not shown) air bag between the cover or topper 10–20 and the truck cab. In other words, the flip-flop top arrangement serves for easy usage. As stated, the invention is adaptable to various configurations of cap or topper 10–20 structures.

The truck bed topper structure described above is, however, susceptible to various changes within the spirit of the invention including, by way of example, a modification wherein the rear section is arranged for lifting and removal, i.e. is selectively separable; pivoting can be accomplished through scissor type lift arrangements disposed on the outer sides of the unit; the rear section can be eccentrically snapped into position, instead of by use of the disclosed hinged relationship; the indicated hinges may include removable concealed pins; proportioning varied; and, the like. Thus, the preceding should be considered as illustrative and not as limiting the scope of the following claims:

I claim:

1. A topper for the bed of a truck having a cab comprising a base section having an upper horizontal surface supported on said truck bed and a secondary section pivotally positioned on said base section along said horizontal surface towards the region of said cab, said secondary section covering a preselected area of said truck bed and selectively movable in an uncovering relationship providing standing access by a user to any uncovered area of said truck bed, and said secondary section including a window in a rear vertical plane thereof providing adjacent surface supported user access.

2. The topper of claim 1 where means are provided for selectively elevating said secondary section.

3. The topper of claim 2 where means associated with said elevating means serve position retaining purposes.

* * * * *